United States Patent [19]
Hutchison et al.

[11] Patent Number: 5,224,392
[45] Date of Patent: * Jul. 6, 1993

[54] VARIABLE PRESSURE RANGE SECTION ACTUATOR PISTON

[75] Inventors: Ronald A. Hutchison, Portage; Daniel A. Monette, Battle Creek, both of Mich.

[73] Assignee: Eaton Corporation, Cleveland, Ohio

[*] Notice: The portion of the term of this patent subsequent to Apr. 6, 2010 has been disclaimed.

[21] Appl. No.: 824,645

[22] Filed: Jan. 23, 1992

[51] Int. Cl.⁵ .............................................. F16H 59/00
[52] U.S. Cl. ..................................... 74/335; 74/336 R
[58] Field of Search ....................... 74/335, 336, 336 R

[56] References Cited

U.S. PATENT DOCUMENTS

| | | | |
|---|---|---|---|
| 3,229,551 | 1/1966 | Stuckey | 74/745 |
| 3,530,668 | 9/1970 | Siebers et al. | 74/336 X |
| 3,939,722 | 2/1976 | Stromberg | 74/336 B |
| 4,296,642 | 10/1981 | Schetter | 74/475 |
| 4,428,469 | 1/1984 | Morscheck et al. | 192/53 E |
| 4,450,869 | 5/1984 | Acker | 137/625.48 |
| 4,690,008 | 9/1987 | Klatt | 74/336 R X |
| 4,754,665 | 7/1988 | Vandervoort | 74/745 |
| 4,788,875 | 12/1988 | Genise | 74/335 X |
| 4,793,378 | 12/1988 | Loeffler et al. | 137/560 |
| 4,920,815 | 5/1990 | Reynolds | 74/335 |
| 4,944,197 | 7/1990 | Stine et al. | 74/477 |
| 4,974,474 | 12/1990 | Newbigging | 74/335 X |
| 4,989,706 | 2/1991 | Morscheck | 192/53 E |
| 4,998,443 | 3/1991 | Janiszewski | 74/335 X |
| 5,092,187 | 3/1992 | Irwin | 74/335 X |

Primary Examiner—Leslie A. Braun
Assistant Examiner—Daniel Wittels
Attorney, Agent, or Firm—H. D. Gordon

[57] ABSTRACT

An auxiliary transmission section (14) shift control system (230)/method is provided which include a residual pressure valve (246) and a one-way restricted flow pressure relief valve (250) to prevent an auxiliary section high speed ratio synchronized clutch (92) damage if the main transmission section (12) is engaged during an auxiliary section upshift. The chamber (224A) of the actuator (220) associated with the high speed synchronizer clutch is constantly gradually vented to a reference pressure through a severely restricted orifice in the one way restricted flow pressure relief valve (250) and the residual pressure valve (246) will block fluid flow from the source (234) to the slave valve (238) whenever the main transmission section is shifted to the not neutral condition thereof. Accordingly, whenever an auxiliary section upshift is attempted while the main transmission section is in the not neutral condition thereof, the actuator (222) will assert a force gradually reduced from a first high force to a second lower force on the high speed range clutch to prevent or minimize damage thereto.

26 Claims, 6 Drawing Sheets

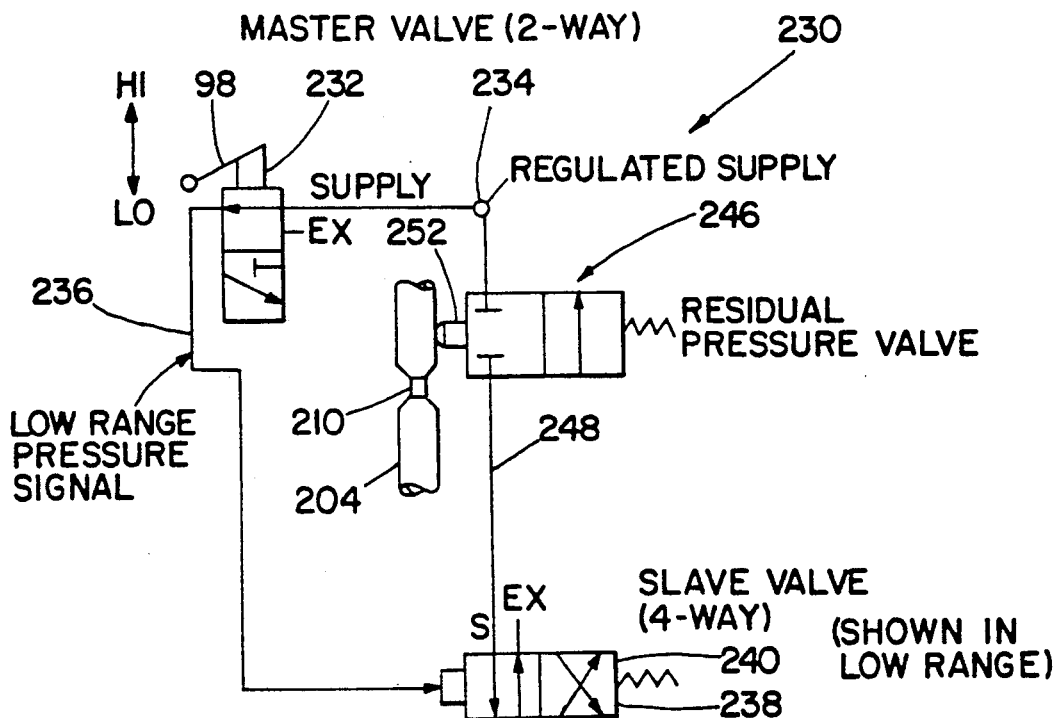
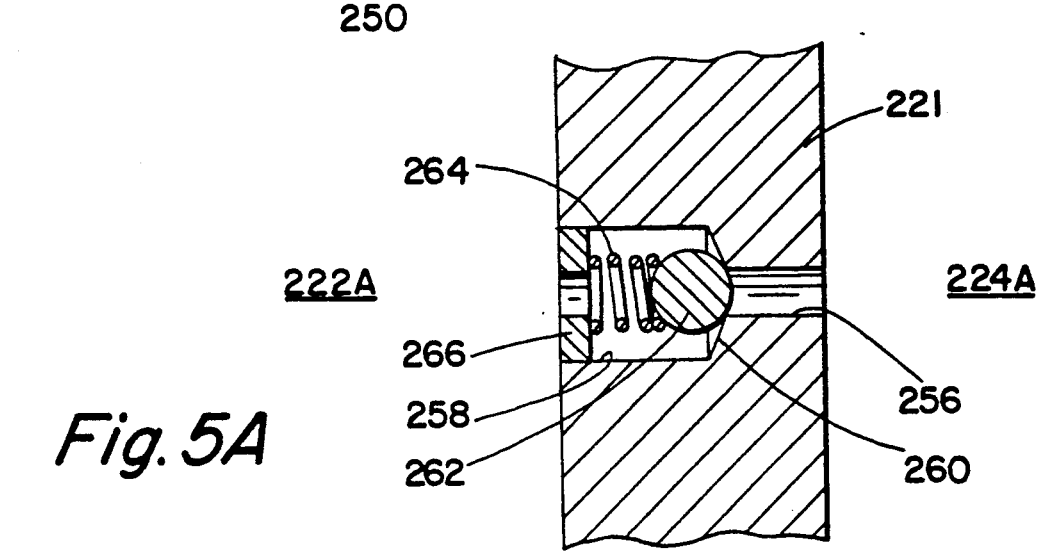
Fig. 5
Fig. 5A

VARIABLE PRESSURE RANGE SECTION ACTUATOR PISTON

RELATED APPLICATIONS

The application is related to copending U.S. patent applications:

Ser. No. 824,924, entitled AUXILIARY SECTION ACTUATOR CONTROL SYSTEM AND METHOD;

Ser. No. 824,673, entitled INTERLOCK MECHANISM FOR RANGE SECTION SLAVE VALVE;

Ser. No. 824,675, entitled RANGE VALVE PRE-EXHAUST;

Ser. No. 824,961, entitled TWO-STAGE RANGE PISTON/CYLINDER ASSEMBLY;

Ser. No. 824,925, entitled RANGE SECTION PROTECTION VALVE ASSEMBLY;

Ser. No. 824,960, entitled DUAL PRESSURE REGULATOR;

Ser. No. 824,672, entitled VARIABLE PRESSURE RANGE SECTION ACTUATOR ASSEMBLY;

Ser. No. 824,957, entitled AUXILIARY SECTION ACTUATOR AIR CONTROL SYSTEM;

Ser. No. 824,638, entitled RANGE SECTION ACTUATOR CONTROL SYSTEM AND METHOD FOR PREVENTING DAMAGE TO RANGE SECTION SYNCHRONIZERS; and Ser. No. 824,956, entitled SYNCHRONIZED SPLITTER SECTION PROTECTION SYSTEM/METHOD;

all assigned to the same assignee, Eaton Corporation and filed the same day, Jan. 23, 1992, as this application.

BACKGROUND OF THE INVENTION

1. Field of the Invention

The present invention relates to an auxiliary section actuator piston control system/method for a vehicular compound transmission. In particular, the present invention relates to pressurized fluid (pneumatic) actuator piston assembly for controlling the engagement of auxiliary section synchronized jaw clutches in compound transmissions of the type comprising one or more multiple speed auxiliary transmission sections connected in series with a multiple speed main transmission section. More particularly, the present invention relates to a pressurized fluid actuator piston control system/method for protecting the auxiliary section synchronized jaw clutches, especially the auxiliary section range high speed synchronized jaw clutch, of a range type compound heavy duty vehicular transmission during a compound shift.

2. Description of the Prior Art

Compound change gear transmissions of the type having one or more auxiliary sections connected in series with a main transmission section are very well known in the prior art. Such transmissions are typically associated with heavy duty vehicles such as large trucks, tractor/semi-trailers, and the like. Briefly, by utilizing main and auxiliary transmission sections connected in series, assuming proper relative sizing of the ratio steps, the total of available transmission ratios is equal to the produce of the main and auxiliary section ratios. By way of example, at least in theory, a compound change gear transmission comprising a four (4) speed main section connected in series with a three (3) speed auxiliary section will provide twelve (4×3=12) available ratios.

Auxiliary transmission sections are of three general types: range type, splitter type or combined range/splitter type.

In compound transmissions having a range type auxiliary section, the range section ratio step or steps are greater than the total ratio coverage of the main transmission section and the main section is shifted progressively through its ratios in each range. Examples of compound transmissions having range type auxiliary sections may be seen by reference to U.S. Pat. Nos. 4,974,474; 4,964,313, 4,920,815; 3,105,395; 2,637,222 and 2,637,221, the disclosure of which are hereby incorporated by reference.

Assignee's well known RT/RTO 11609 and RT/RTO 11610 "Roadranger" transmissions are examples of a "(4+1)×(2)", nine speed and "(5)×(2)" ten speed heavy duty range type transmissions.

In compound transmissions having a splitter type auxiliary section, the ratio steps of the splitter auxiliary section are less than the ratio steps of the main transmission section and each main section ratio is split, or subdivided, by the splitter section. Examples of compound change gear transmissions having splitter type auxiliary sections may be seen by reference to U.S. Pat. Nos. 4,290,515; 3,799,002; 4,440,037 and 4,527,447, the disclosures of which are hereby incorporated by reference.

In a combined range and splitter type auxiliary section, or sections, both range and splitter type ratios are provided allowing the main section to be progressively shifted through its ratios in at least two ranges and also allowing the main section ratios to be split in at least one range.

One example of a compound transmission having a single combined range/splitter type auxiliary section may be seen by reference to U.S. Pat. Nos. 3,283,613; 3,648,546, the disclosures of which are hereby incorporated by reference. A three gear layer, four-speed combined splitter/range type auxiliary section may be seen by reference to U.S. Pat. No. 4,754,665, the disclosure of which is hereby incorporated by reference. Assignee's well known RT/RTO 11613 and RT/RTO 14718 "Eaton Roadranger" transmissions are examples of a "(4+1)×(3)" thirteen-speed and a "(4+1)×(4)" eighteen-speed combined range/splitter type transmission.

Another example is the "Ecosplit" model of transmission sold by Zahnradfabrik Friedrichshafen Aktiengeseushaft of Friedrichshafen, Federal Replubich of Germany which utilizes a separate splitter auxiliary section in front of, and a separate range auxiliary section behind, the main transmission section.

It should be noted that the terms main and auxiliary sections are relative and that if the designations of the main and auxiliary sections are reversed, the type of auxiliary section (either range or splitter) will also be reversed. In other words, given wheat is conventionally considered a four-speed main section with two-speed range type auxiliary section, if the normally designated auxiliary is considered the main section, the normally designated main section would be considered a four-speed splitter type auxiliary section therefor. By generally accepted transmission industry convention, and as used in this description of the invention, the main transmission section of a compound transmission is that section which contains the largest (or at least no less) number of forward speed ratios, which allows section of a neutral position, which contains the reverse ratio(s)

and/or which is shifted (in manual or semiautomatic transmissions) by manipulation of a shift bar or shift rail or shift shaft/shift finger assembly as opposed to master/slave valve/cylinder arrangements or the like.

In compound transmissions of the range or the combined range/splitter or splitter/range types, the main transmission section is typically shifted by means of a shift bar housing assembly, or single shift shaft assembly, controlled by a manually operated shift lever or the like and the auxiliary range section is shifted, in "repeat H" type transmissions, by means of button or switch, usually manually operated, which controls a remote slave valve/actuator mechanism. In so-called "double H" or "one and one-half H" type controls, the range is shifted by switches responsive to positioning of the shift lever. Double H type controls are well known in the prior art as may be seen by reference to U.S. Pat. Nos. 4,633,725 and 4,275,612, the disclosures of which are incorporated hereby by reference.

As the range section often utilizes synchronized jaw clutches, to provide acceptable shift quality and prevent undue wear and/or damage to the range section synchronized jaw clutches, it has been an object of the prior art to provide devices to assure that a range shift be initiated and hopefully completed while the main transmission section is in neutral.

In view of the above, the prior art compound range type transmissions usually include a control system, usually a pneumatic control system, including interlock devices, which allowed a range shift to be preselected by use of a selector button or switch at a master control valve but not initiated until the main transmission section is shifted to, or at least towards, the neutral condition, Such systems typically utilized interlocks of the mechanical type on the range section actuator mechanical linkage which physically prevented movement of the range section shift fork until the main section shifted into neutral or of the type wherein the valve (often called the "slave valve") supplying pressurized air to the range section pistons is either disabled or not provided with pressurized fluid until a shift to main section neutral is sensed, or is only activated and provided with pressurized fluid while the main section is shifted to and remains in neutral. Examples of such transmissions and the control systems therefore may be seen by reference to U.S. Pat. Nos. 2,654,268; 3,138,965 and 4,060,005, the disclosures of which are hereby incorporated by reference. Transmissions using range section control valves (supply and/or exhaust) which are interlocked until a main section shift to neutral occurs may be seen by reference to U.S. Pat. Nos. 3,229,551; 4,450,869; 4,793,378 and 4,974,474, the disclosures of which are incorporated by reference.

While the prior art systems do provide considerable protection for the range section synchronizers by preventing initiation of a range shift until the main section is shifted into neutral, they are not totally satisfactory as while they assure that a range section shift will not initiate until the main section is in neutral, they do not prevent the condition wherein the main section shift is faster than (i.e. "beats") the range shift. As is well known, under certain conditions, if the range synchronized clutch attempts to engage while main section is engaged, a portion of the engine torque is transferred to the vehicular drive wheels entirely by the engaged synchronizer friction surfaces and the synchronizer friction members can be rapidly damaged. In such condition, the range synchronizers, especially the direct or high speed range synchronizer may be damaged or destroyed relatively quickly. In the event of an unintended attempt to make a range only shift, such damage may occur within about two (2.0) seconds.

Transmissions utilizing mechanical interlock devices, of both the rigid and the resilient type, may be seen by reference to U.S. Pat. Nos. 4,974,474; 4,944,197 and 4,296,642, the disclosures of which are hereby incorporated by reference. Such devices typically locked the range clutch into high or low position while the main section is not in neutral and/or locked the main section in neutral if the range clutch was not engaged in the high or low speed position thereof. While these systems will, when operating properly, prevent damage to the range synchronizers caused by attempting to engage a range clutch wile the main section is not in neutral, they were not totally satisfactory as (i) a fast main section shift can result in the auxiliary section being locked in an undesirable ratio, (ii) if a range clutch is hung up on the blocker the main section cannot be engaged to manipulate the clutches, (iii) resilient devices may not properly interlock or may bind, (iv) considerable wear and stress may be caused to the interlock and/or shift actuator members and/or (v) with wear, friction locks of the interlock mechanisms may occur.

SUMMARY OF THE INVENTION

In accordance with the present invention, the drawbacks of the prior art are minimized or overcome by the provision of an auxiliary section actuator piston control system/method which will protect the auxiliary section synchronizers if the main section is engaged prior to completion of an attempted auxiliary section shift and which will also allow the attempted auxiliary section shift to be completed upon the jaw clutch members of the engaging synchronized clutch achieving a substantially synchronous rotation.

The above is accomplished by providing auxiliary section actuator control means for sensing if main transmission section is in the neutral or in the not neutral condition thereof, and is responsive to cause the supply pressure to be blocked and the pressurized piston chamber to be sealed if the main section is not in neutral. Such systems are known and are referred to as "residual pressure" systems. Further, a one-way, restricted flow, pressure relief valve assembly is provided in fluid communication with the actuator cylinder chamber associated with the high speed range clutch which, when that chamber is pressurized and sealed, will gradually vent the chamber down to a lower pressure whereby the high speed ratio range clutch will be applied with a first, relatively high force if the main section is in neutral and to be applied with a gradually decreasing second, relatively lower force if the main section is not in neutral. The one-way, restricted flow pressure relief valve is configured such that during active pressurization of the high-speed range clutch cylinder chamber, the flow therethrough to exhaust will not significantly lower the pressure in the chamber.

The invention is particularly well suited for controlling the engagement of the range high speed or direct synchronized clutch. Protection for the low speed or reduction synchronized auxiliary section clutch is usually not required as when shifting into auxiliary low, torque across the synchronizer friction surfaces will tend, especially in pin type synchronizers, to cause unblocking of a blocked synchronizer to cause rapid engagement of the clutch.

Accordingly, it is an object of the present invention to provide a new and improved auxiliary section (range) shifting control system for a compound transmission of the type utilizing synchronized jaw clutches in the auxiliary sections thereof.

Another object of the present invention is to provide pressurized fluid actuated auxiliary section actuator system for urging engagement of a selected auxiliary section synchronized clutch (usually the direct or high speed range ratio) with a first relatively high force if the main transmission section is in neutral or with a force gradually decreasing from said high force to a relatively lower second force if the main transmission section is not in neutral.

These and other objects and advantages of the present invention will become apparent from a reading of the detailed description of the preferred embodiment taken in connection with the attached drawings.

BRIEF DESCRIPTION OF THE DRAWINGS

FIG. 1 is a schematic illustration of a compound transmission having a combined splitter/range type auxiliary section with which the pneumatic control system of the present invention is particularly useful.

FIG. 5 is a schematic illustration of an air control system for implementing the present invention.

FIG. 5A is an enlarged view of a portion of FIG. 5.

DESCRIPTION OF THE PREFERRED EMBODIMENT

Figure 1:
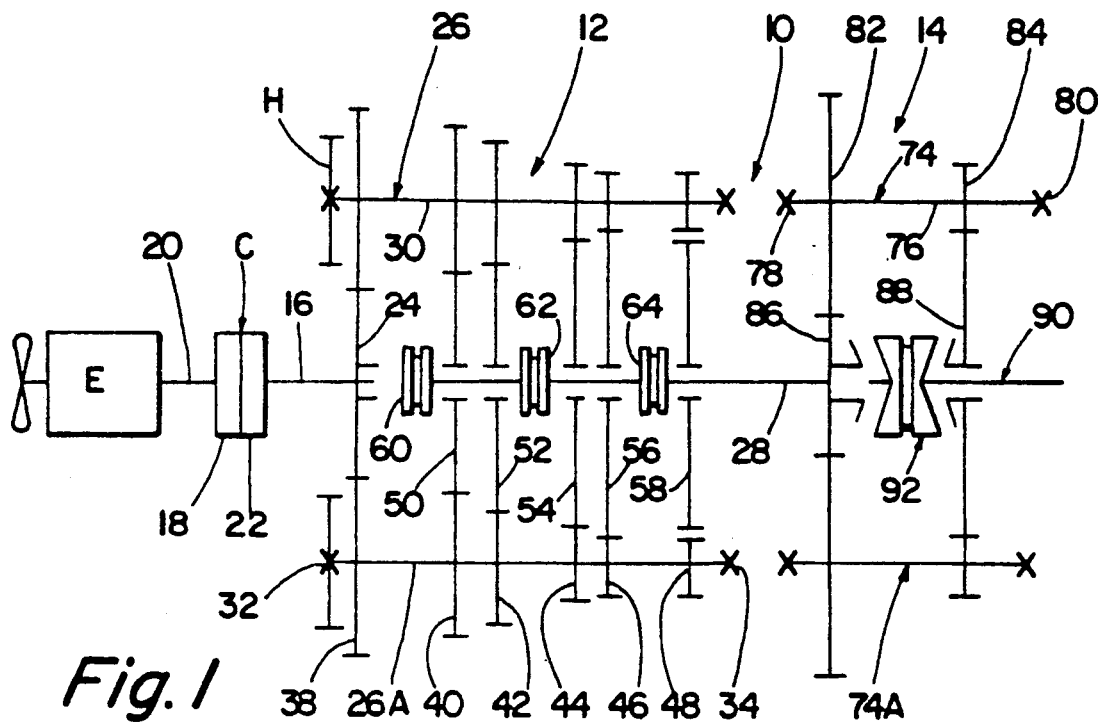
FIG. 1 is a schematic illustration of a compound transmission having a range type auxiliary section and utilizing the pneumatic control system of the present invention.

Certain terminology will be used in the following description for convenience in reference only and will not be limiting. The words "upwardly", "downwardly", "rightwardly", and "leftwardly" will designate directions in the drawings to which reference is made. The words "forward", "rearward", will refer respectively to the front and rear ends of the transmission as conventionally mounted in a vehicle, being respectfully from left and right sides of the transmission as illustrated in FIG. 1. The words "inwardly" and "outwardly" will refer to directions toward and away from, respectively, the geometric center of the device an designated parts thereof. Said terminology will include the words above specifically mentioned, derivatives thereof and words of similar import.

The term "compound transmission" is used to designate a change speed or change gear transmission having a multiple forward speed main transmission section and a multiple speed auxiliary transmission section connected in series whereby the selected gear reduction in the main transmission section may be compounded by further selected gear reduction in the auxiliary transmission section. "Synchronized clutch assembly" and words of similarly import shall designate a positive, jaw-type clutch assembly utilized to nonrotatably couple a selected gear to a shaft by means of a positive clutch in which attempted engagement of said clutch is prevented until the members of the clutch are at substantially synchronous rotation and relatively large capacity friction means are utilized with the clutch members and are sufficient, upon initiation of a clutch engagement, to cause the clutch members and all members rotating therewith to rotate at substantially synchronous speed.

Figure 2:
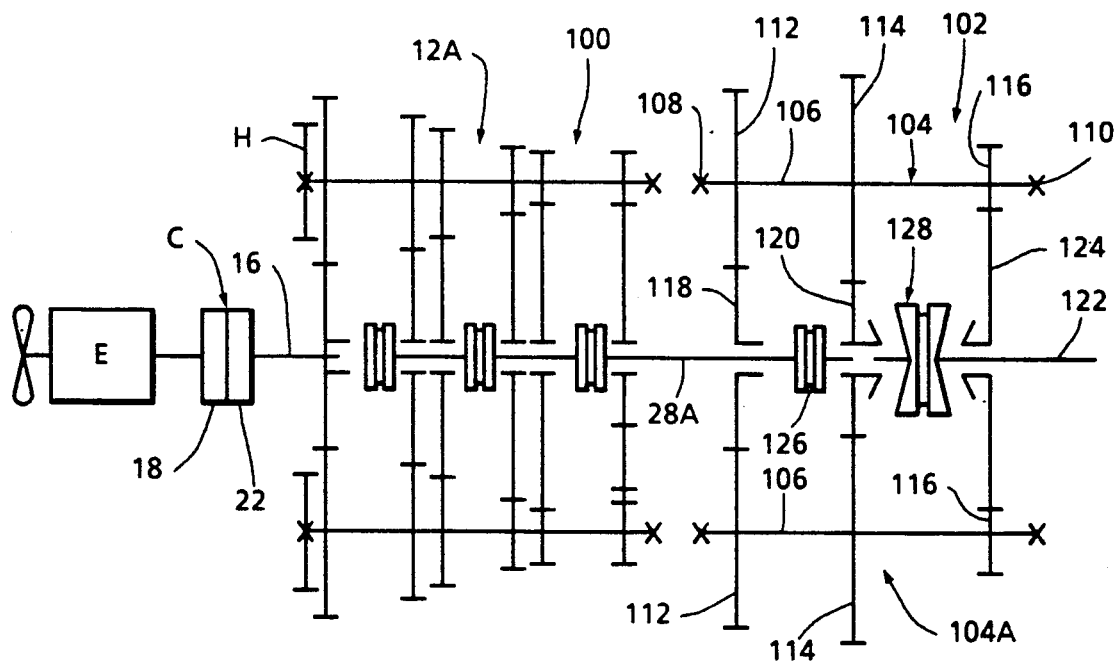
FIG. 2A is a schematic illustration of the shift pattern for the transmission of FIG. 2.

The terms "neutral" and "not engaged" are used interchangeably and refer to a main transmission section condition wherein torque is not transferred from the transmission input shaft to the mainshaft (in transmissions of the general type illustrated in FIGS. 1 and 2). The terms "not neutral" and "engaged" are used interchangeably and refer to a main transmission section condition wherein a main section drive ratio is engaged and drive torque is transferred from the transmission input shaft to the main shaft (in transmissions of the general type illustrated in FIGS. 1 and 2).

The term "high speed" ratio refers to that ratio of a transmission section wherein the rotational speed of the output is greatest for a given input rotational speed.

Figure 1A:
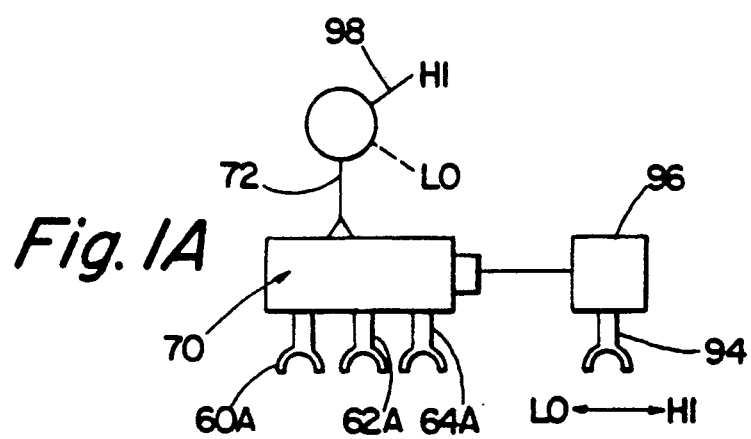
FIG. 1A is a schematic illustration of the shifting mechanisms of the transmission of FIG. 1.
Figure 1B:
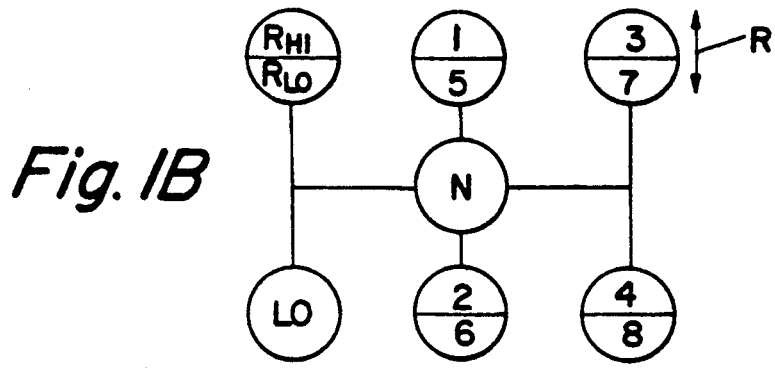
FIG. 1B is a schematic illustration of the "repeat H" type shift pattern of the transmission of FIG. 1.
Figure 1C:
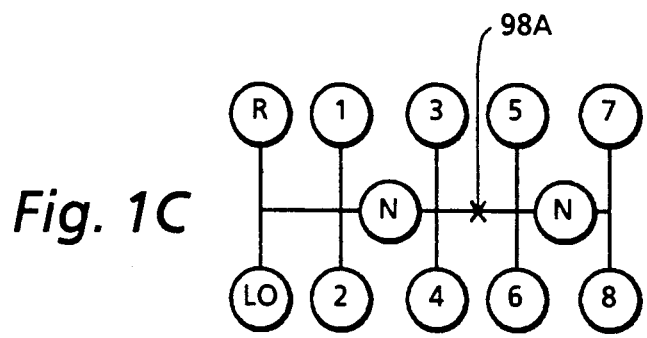
FIG. 1C is a schematic illustration of a "double H" type shift pattern for the transmission of FIG. 1.

Referring to FIGS. 1, 1A and 1B, a range type compound transmission 10 is illustrated. Compound transmission 10 comprises a multiple speed main transmission section 12 connected in series with a range type auxiliary section 14. Transmission 10 is housed within a housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

In main transmission section 12, the input shaft 16 carries an input gear 24 for simultaneously driving a plurality of substantially identical countershaft assemblies 26 and 26A at substantially identical rotational speeds. The two substantially identical countershaft assemblies are provided on diameterically opposite sides of mainshaft 28 which is generally coaxially aligned with the input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46 and 48, fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62 and 64 as is well known in the prior art. Clutch collar 60 may also be utilized to clutch input gear 24 to mainshaft 28 to provide a direct drive relationship between input shaft 16 and mainshaft 28.

Typically, clutch collars 60, 62 and 64 are axially positioned by means of shift forks 60A, 62A and 64A, respectively, associated with the shift housing assembly 70, as well known in the prior art. Clutch collars 60, 62 and 64 may be of the well known synchronized or non-synchronized double acting jaw clutch type.

Mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio, namely that provided by drivingly connecting mainshaft drive gear 56 to mainshaft 28, is often of such a high gear reduction it has to be considered a low or "creeper" gear which is utilized only for starting of a vehicle under severe conditions and is not usually utilized in the high transmission range. Accordingly, while main transmission section 12 does provide five forward speeds, it is usually referred to as a "four plus one" or "(4+1)" main section as only four of the forward speeds are compounded by the auxiliary range transmission section 14 utilized therewith.

Jaw clutches 60, 62, and 64 are three-position clutches in that they may be positioned in the centered, nonengaged position as illustrated, or in a fully rightwardly engaged or fully leftwardly engaged position by means of a shift lever 72. As is well known, only one of the clutches 60, 62 and 64 is engageable at a given time and main section interlock means (not shown) are provided to lock the other clutches in the neutral condition.

Auxiliary transmission range section 14 includes two substantially identical auxiliary countershaft assemblies 74 and 74A, each comprising an auxiliary countershaft 76 supported by bearings 78 and 80 in housing H and carrying two auxiliary section countershaft gears 82 and 84 for rotation therewith. Auxiliary countershaft gears 82 are constantly meshed with and support range/output gear 86 which is fixed for rotation with mainshaft 28 while auxiliary section countershaft gears 84 are constantly meshed with output gear 88 which surrounds transmission output shaft 90.

A two-position synchronized jaw clutch assembly 92, which is axially positioned by means of shift fork 94 and the range section shifting actuator assembly 96, is provided for clutching either gear 86 to mainshaft 28 for low range operation or gear 88 to mainshaft 28 for direct or high range operation of the compound transmission 10. The "repeat H" type shift pattern for compound range type transmission 10 is schematically illustrated in FIG. 1B. Selection and/or preselection of low or high range operation of the transmission 10 is by means of an operator actuated switch or button 98 which is usually located at the shift lever 72.

Although the range type auxiliary section 14 is illustrated as a two-speed section utilizing spur or helical type gearing, it is understood that the present invention is also applicable to range type transmissions utilizing combined splitter/range type auxiliary sections, having three or more selectable range ratios and/or utilizing planetary type gearing. Also, as indicated above, any one or more of clutches 60, 62 or 64 may be of the synchronized jaw clutch type and transmission sections 12 and/or 14 may be of the single countershaft type.

The main transmission section 12 is controlled by axial movement of at least one shift rail or shift shaft contained within the shift bar housing 70 and controlled by operation of the shift lever 72. As is known, shift lever 72 may be mounted directly to, or remotely from, the transmission. Devices of this type are well known in the prior art and may be seen by reference to U.S. Pat. No. 4,621,537, the disclosure of which is hereby incorporated by reference. The range section is controlled by operation of button 98, or a position switch 98A in the case of a "double H" type control, both as well known in the prior art. Shift bar housing 70 may also be of the more conventional multiple shift rail type, well known in the prior art as may be seen by reference to U.S. Pat. Nos. 4,782,719; 4,738,863; 4,722,237 and 4,614,126, the disclosures of which are incorporated by reference.

The control system of the present invention is equally applicable to compound transmissions having range, combined range/splitter or splitter/range type auxiliary sections.

Referring to FIG. 2, compound change gear mechanical transmission 100 is an eighteen forward speed transmission comprising a main transmission section 12A, identical, or substantially identical, to main transmission section 12 described above in reference to prior art transmission 10. Main transmission section 12A of transmission 100 differs from main transmission section 12 of transmission 10 only in that main shaft 28A extends slightly further into the auxiliary transmission section 102 than does main shaft 28 extend into auxiliary transmission section 14. In view of the substantially identical structure of main transmission sections 12 and 12A, main transmission section 12A will not be described again in detail.

Auxiliary transmission section 102 includes two substantially identical auxiliary countershaft assemblies 104 and 104A, each comprising an auxiliary countershaft 106 supported by bearings 108 ad 110 in housing H and carrying three auxiliary section countershaft gears 112, 114 and 116 fixed for rotation therewith. Auxiliary countershaft gears 112 are constantly meshed with and support auxiliary section splitter gear 118 which surrounds mainshaft 28A. Auxiliary countershaft gears 114 are constantly meshed with and support auxiliary section splitter/range gear 120 which surrounds the output shaft 122 at the end thereof adjacent the coaxial end of mainshaft 28A. Auxiliary section countershaft gears 116 constantly mesh and support auxiliary section range gear 124, which surrounds the output shaft 122. Accordingly, auxiliary section countershaft gears 112 and splitter gear 118 define a first gear layer, auxiliary section countershaft gears 114 and splitter/range gear 120 define a second gear layer and auxiliary section countershaft gears 116 and range gear 124 define a third layer, or gear group of the combined splitter and range type auxiliary transmission section 102.

A sliding two position jaw clutch collar 126 is utilized to selectively couple either the splitter gear 118 or the splitter/range gear 120 to the mainshaft 28A, while a two position synchronized clutch assembly 128 is utilized to selectively couple the splitter/range gear 120 or the range gear 124 to the output shaft 122. The structure and function of double acting sliding jaw clutch collar 126 is substantially identical to the structure and function of sliding clutch collars 60, 62 and 64 utilized in connection with transmission 10 while the structure and function of double acting synchronized clutch assembly 128 is substantially identical to the structure and function of synchronized clutch assembly 92 utilized in connection with transmission 10. Synchronized clutch assemblies such as assemblies 92 and 128 are well known in the prior art and examples thereof may be seen by reference to U.S. Pat. Nos. 4,462,489; 4,125,179 and 2,667,955, the disclosures of all of which are incorporated by reference.

Such clutches typically include a pair of axially engageable jaw clutch members, a sensor/blocker device for sensing nonsynchronous rotation of the jaw clutch members and the blocking axial engagement thereof and a pair of friction surfaces, often conical, which are urged into contact to frictionally connect the jaw clutch members to cause substantially synchronous rotation thereof. During attempted engagement of such assemblies, assuming a substantial nonsynchronous condition, the clutch will assume a blocked position wherein the blocker device prevents axial engagement of the jaw clutch members and the friction surfaces are engaged under force. If the clutch assembly remains in the blocked position under a high axial engagement force while the main transmission is engaged for an extended period of time, excessive torque loading can damage and/or destroy the friction surfaces.

Figure 3A:
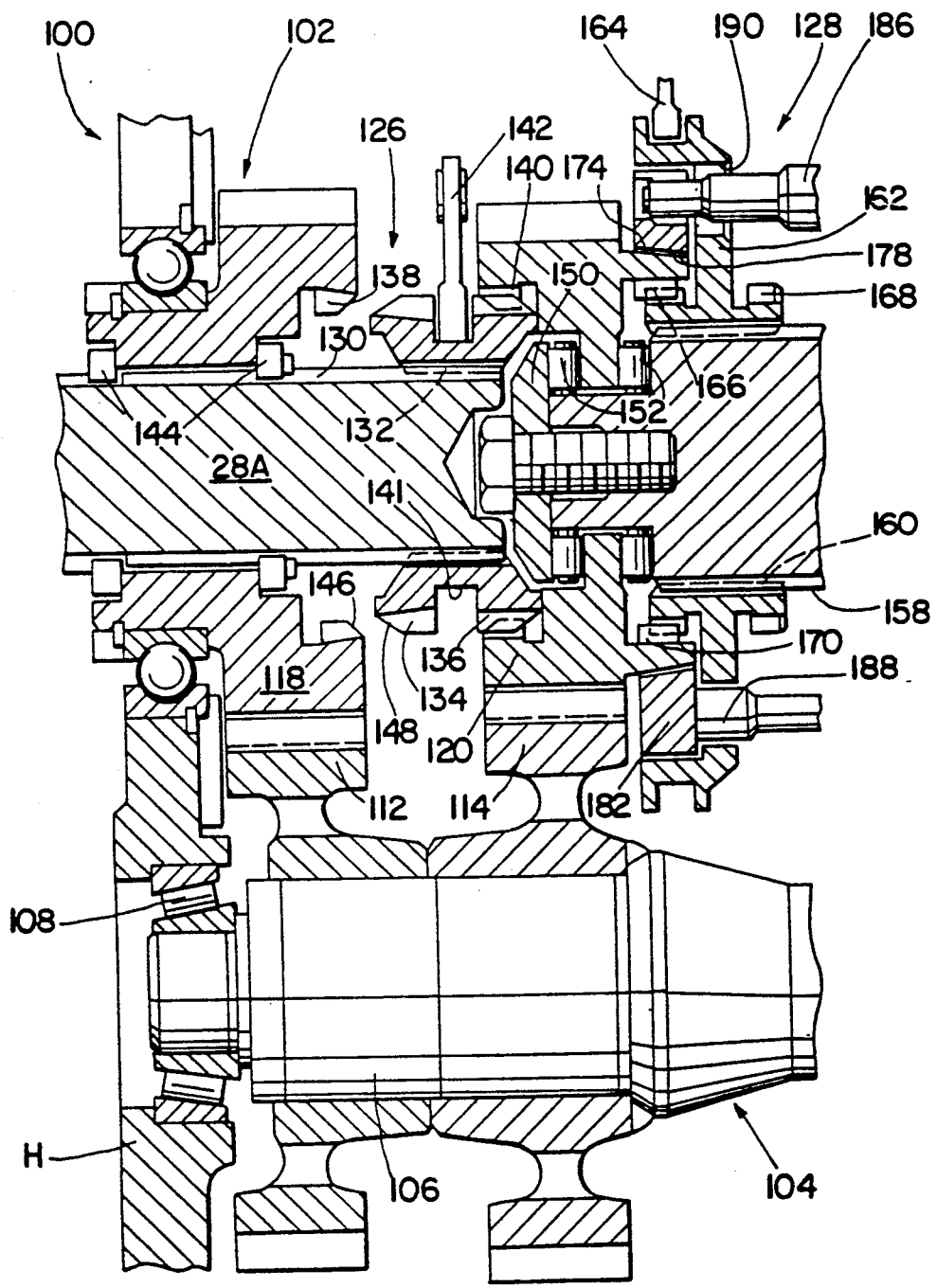
FIG. 3 (A and B) is a partial view, in cross-section, of the auxiliary section 102 of transmission 100.
Figure 3B:
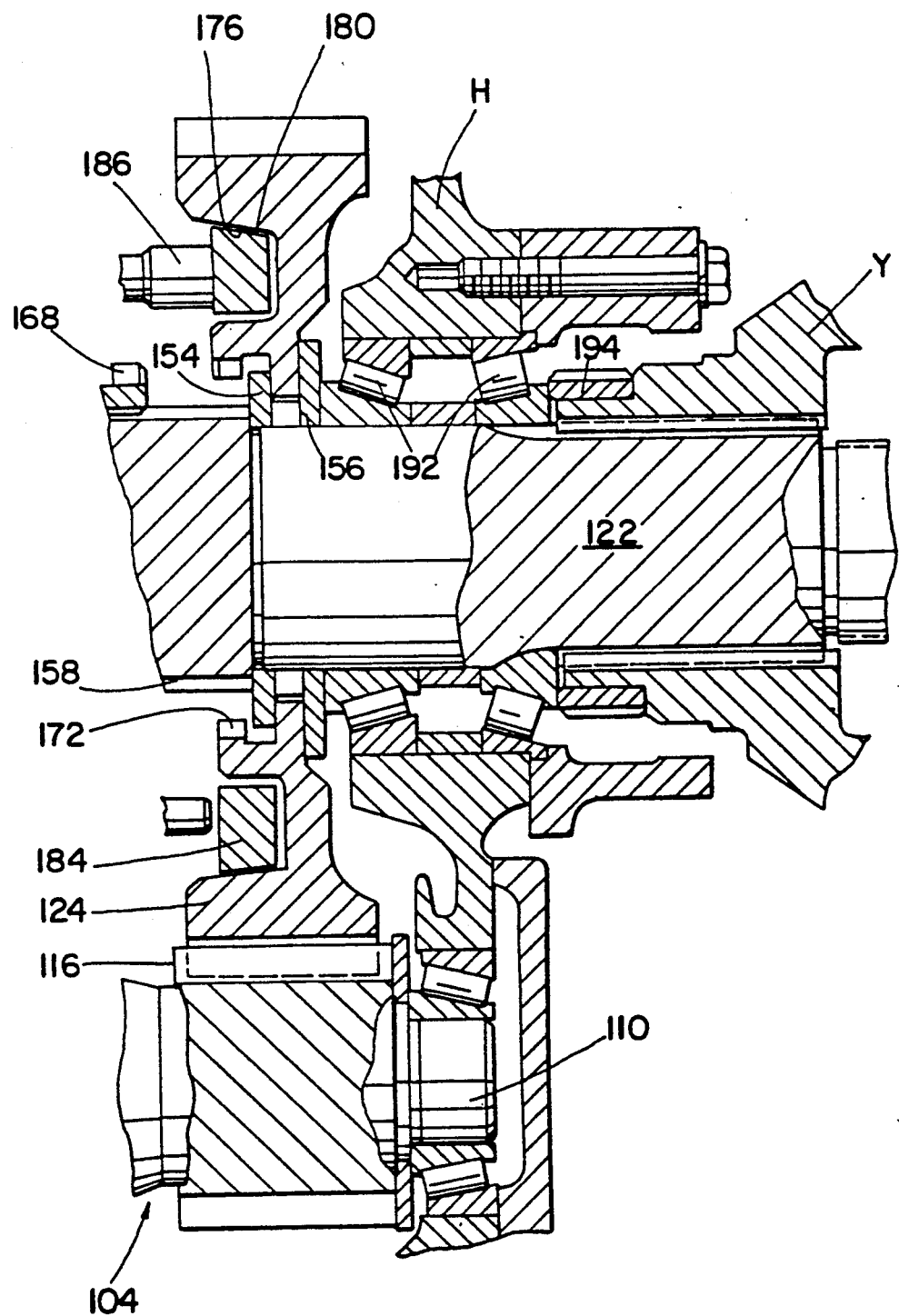

The detailed structure of the preferred embodiment of auxiliary section 102 is illustrated in FIGS. 3A and 3B, wherein it may be seen that the rearward end of mainshaft 28A extending into the auxiliary transmission section 102 is provided with external splines 130 which mate with internal splines 132 provided on clutch collar 126 for rotationally coupling clutch collar 126 to the mainshaft 28A while allowing relative axial movement therebetween. The clutch collar 126 is provided with clutch teeth 134 and 136 for selective axial engagement with clutch teeth 138 and 140 provided on gears 118 and 120, respectively. The clutch collar 126 is also provided with a groove 141 for receipt of a shift fork 142.

Gear 118 surrounds mainshaft 28A and is normally free to rotate relative thereto and is axially retained relative to the mainshaft 28A by means of retainers 144. Clutch teeth 136 and 138 present tapered surfaces 146 and 148 which are inclines at about 35° relative to the axis of the mainshaft 28A which provides an advantageous interaction tending to resist nonsynchronous engagement and also tending to cause a synchronous rotation as is described in greater detail in U.S. Pat. No. 3,265,173, the disclosure of which is hereby incorporated by reference. Clutch teeth 136 and 140 are provided with similar complementary tapered surfaces.

Splitter/range gear 120 is rotatably supported at the inward end 150 of output 122 by means of a pair of thrust bearings while range gear 124 surrounds the output shaft 122 and is axially retained thereon by means of thrust washers. Located axially between gears 120 and 124, and rotationally fixed to output shaft 122 by means of external splines and internal splines, is the double acting two position synchronized clutch assembly 128. Many of the well known synchronized positive clutch structures are suitable for use in the auxiliary transmission section of the present invention. The synchronized clutch assembly 128 illustrated is of the pin type described in above mentioned U.S. Pat. No. 4,462,489. Briefly, the synchronized clutch assembly 128 includes a slidable jaw clutch member 162 axially positioned by a shift fork 164 and carrying clutch teeth 166 and 168, respectively, for axial engagement with clutch teeth 170 and 172, respectively, carried by gears 120 and 124, respectively. Gears 120 and 124 define cone friction surfaces 174 and 176, respectively, for frictional synchronizing engagement with matching frictional cone surfaces 178 and 180, respectively, carried by the friction rings 182 and 184, respectively, of the synchronized clutch assembly. Blocker pins 186 and 188 are rotationally fixed to the friction rings 184 and 182, respectively, and interact with blocker openings 190 carried by the sliding member 162 to provide the blocking function as is well known in the prior art. Synchronizing assembly 128 may also include a plurality of spring pins (not shown) for providing initial engagement of the conical friction surfaces at the initiation of a clutch engagement operation.

By monitoring the axial position of shift fork 91/164, or of members axially movable therewith, the current condition of the synchronized clutch assembly may be determined.

Output shaft 122 is supported by bearings 192 in housing H and extends therefrom for attachment of a yolk member Y or the like which typically forms a portion of a universal joint for driving a propeller shaft to a differential or the like. The output shaft 122 may also carry a speedometer gear 194 and/or various sealing elements (not shown).

As may be seen by reference to FIGS. 2 and 3, by selectively axially positioning both the splitter clutch 126 and the range clutch 128 in the forward and rearward axial positions thereof, four distinct ratios of main shaft rotation to output shaft rotation may be provided. Accordingly, auxiliary transmission section 102 is a 3-layer auxiliary section of the combined range and splitter type providing four selectable speeds or drive ratios between the input (countershaft 28A) and output (output shaft 122) thereof. Transmissions of this type are well known in the prior art and are sold by assignee Eaton Corporation under the trade names "Super 10" and "Super 18" and may be seen in greater detail by reference to U.S. Pat. No. 4,754,665, the disclosure of which is incorporated herein by reference.

Figure 2A:
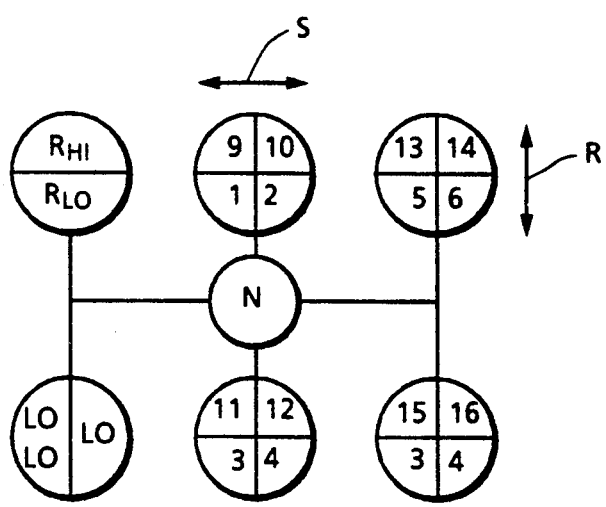

The shift pattern for the transmission 100 is schematically illustrated in FIG. 2A wherein the "S" arrow indicate a splitter shift and the "R" arrow indicates a range shift.

Figure 4:
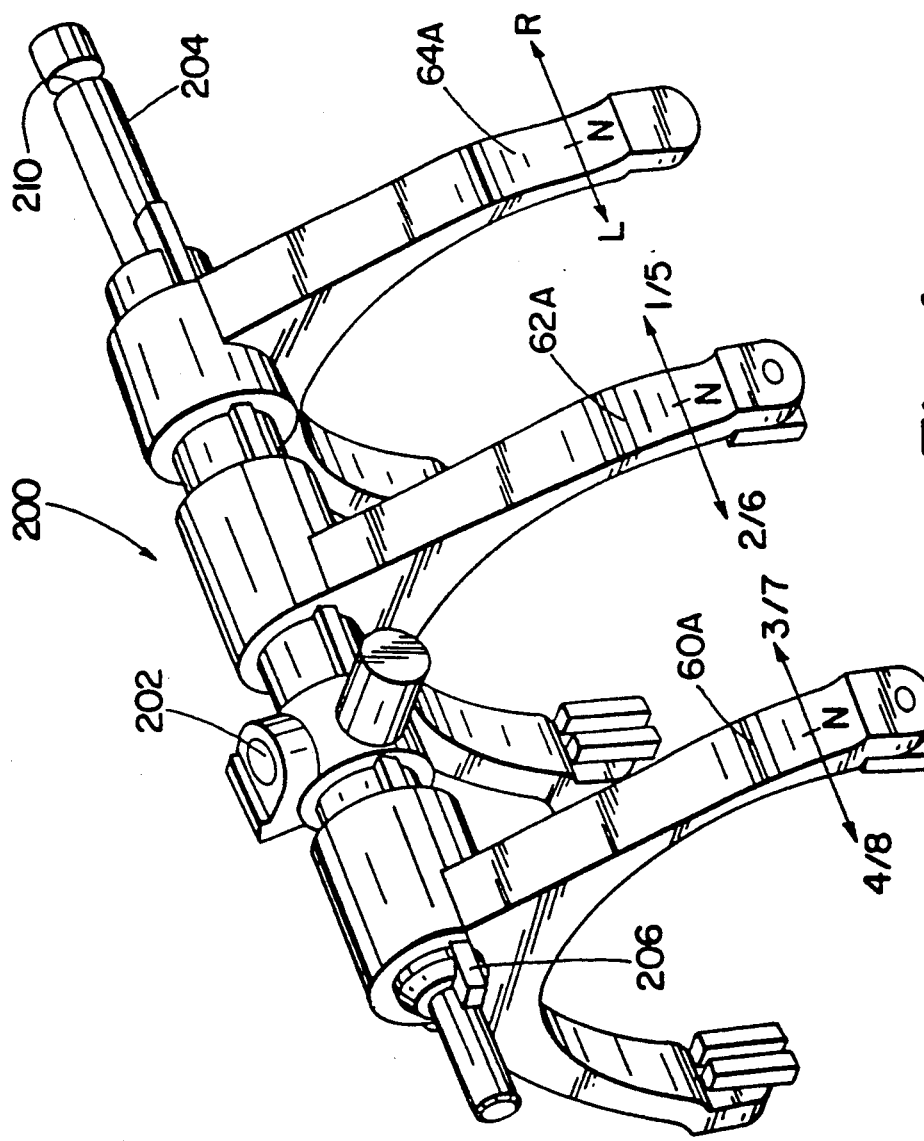
FIG. 4 is a prospective view of a single shift shaft type shifting mechanism.

In the preferred embodiment of the present invention, a single shift shaft type shifting mechanism 200 of the type illustrated in FIG. 4 is utilized. Mechanisms of this type are known in the prior art as may be seen by reference to U.S. Pat. Nos. 4,920,815 and 4,621,537, the disclosures of which are incorporated herein by reference.

Briefly, shift lever 98 will interact with block member 202 to cause rotational or axial movement of shaft 204 relative to the transmission housing. Rotational movement will cause keys, such as key 206 and another unseen key, to interact with lands or slots provided in the hubs of the shift forks 60A, 62A and 64A to axially fix two of the shift forks relative to the housing and to axially fix the other shift fork to shaft 204. Axial movement of the shaft 204 and the selected shift fork axially fixed thereto will then result in engagement and disengagement of the jaw clutches associated therewith.

Accordingly, by monitoring of the axial position of a selected segment of shift shaft 204, such as one or more neutral detent notches 210, the in neutral-not in neutral condition of the main section 12 of transmission 10 may be sensed.

The present invention is also applicable to compound transmissions utilizing the well known multiple parallel rail type shift bar housing assemblies as may be seen by reference to U.S. Pat. Nos. 4,445,393; 4,275,612; 4,584,895 and 4,722,237, the disclosures of which are hereby incorporated by reference. Such devices typically include an assembly extending perpendicular to the shift rails (often associated with a shift rail interlock mechanism) which will assume a first position when all of the shift rails are in an axially centered neutral position or a second position when any one of the shift rails is displaced from the axially centered neutral position thereof.

Although the auxiliary transmission sections are typically attached to the main transmission section, the term "auxiliary transmission section" as used herein is also applicable to detached drive train devices such as multiple-speed axles, multiple-speed transfer cases and the like.

While the present invention is equally applicable to transmission 10 illustrated in FIG. 1 and transmission 100 illustrated in FIGS. 2, 3A and 3B, as well as other compound transmissions utilizing synchronized auxiliary section jaw clutch assemblies, for purposes of simplification and ease of understanding, the present invention will be described primarily as utilized with the compound range type transmission illustrated in FIGS. 1, 1A, 1B and 1C.

Assuming a shift control of the type illustrated in FIG. 1B, i.e. a "repeat H" type control, a 4th-to-5th speed compound shift involves disengaging jaw clutch 60 from 4th/8th speed input gear 24, then disengaging clutch 92 from range low speed or reduction gear 86 and engaging clutch 92 with the high speed or direct range gear 88 and then engaging jaw clutch 62 with 1st/5th speed main section gear 54. To accomplish this, the vehicle operator will preselect "HI" with the range selector button 98, will shift from the 4/8 position to N and then to the 1/5 position with shift lever 72. In prior art range type transmissions, such as the 9-speed RT/RTO 11609 "Roadranger" transmission manufactured and sold by Eaton Corporation, a two-position slave valve having a first position for causing "HI" range to be selected and a second position for causing "LO" range to be selected was interlocked in one of its two positions by a plunger or the like wherever the main transmission section 10 was not in neutral. Examples of such valves and interlocks may be seen by reference to above-mentioned U.S. Pat. Nos. 3,229,551; 4,450,869; 4,793,378 and 4,974,474.

As indicated previously, while these devices will, under most conditions, protect the range section synchronizers by preventing initiation of a range shift until the main section is shifted into neutral, under certain conditions the main section shift may complete prior to the range shift which will place the range synchronizer at risk. This is a considerably greater problem for range upshifts (4th-to-5th) than for range downshifts (5th-to-4th) as torque across the synchronizer friction cone surfaces (174/178 in FIG. 3A) when engaging direct range gear 88 will tend to increase the tendency of the synchronizer being hung up on the synchronizer blockers while torque across the friction cone surfaces (176/180 in FIG. 3B) when engaging reduction range gear 86 will tend to pull the synchronizer to an unblocked condition. Generally, in transmissions of the type illustrated in FIGS. 1 and 2, range section synchronizer burn-out is not seen as a significant problem in range section downshifts.

Referring to the transmission of FIG. 1, another serious problem may occur when a driver in 4th gear decides to upshift, then preselects a range upshift and then moves the shift lever to or towards the neutral position. If the driver quickly changes his mind and moves the shift lever back to the 4/8 position without changing the range selection, the range clutch may attempt to complete a range only 4-8 upshift and the large speed differential across the synchronizer cone friction surfaces may result in rapid damage thereto, In such situations, a synchronizer may be severely damaged or destroyed with two seconds.

Similar inadvertent attempted compound skip upshifts will have similar results. For another example, if a driver inadvertently preselects or forgets a preselection of a range upshift, and then attempts a 4-3 downshift, the actual result will be an attempted 4-7 upshift with a large speed differential across the synchronizer friction surfaces.

The auxiliary section control system/method of the present invention overcomes the prior art drawbacks by gradually reducing the force applied by shift fork 94 to engage high speed range gear 86 to a relatively low level when a main section not neutral condition is sensed. The relatively low force is selected to be sufficient to cause the synchronized clutch to engage when synchronous conditions occur but low enough to assure that the risk of synchronizer burn out is minimized or eliminated.

While the present invention is particularly well suited for use in controlling the engagement of a synchronized range clutch, especially the high speed or direct range clutch of a compound transmission, it is not intended to be limited to such use and could be useful in controlling the engagement of synchronized splitter clutches or the like.

For purposes of simplification, the present invention will be described in connection with its expected most advantageous use, namely controlling the force applied to engage the direct or high speed synchronized range clutch (clutch teeth 166 and 170 in FIG. 3A) of a range (10), range/splitter or splitter/range (100) type of compound transmission.

While the typical force applied to engage a range clutch is a function of the effective fluid pressure (usually pneumatic) applied to an effective piston area, engagement force may also be applied by electromechanical means such as electric motor driven ball screws or the like, electromagnetic means such as solenoid type devices, or other force application means. With fluid pressure application systems, the application force applied to a range clutch is variable by varying the effective fluid pressure and/or effective piston area. With electromagnetic and electromechanical systems, force may be varied by varying the electric current, voltage or the like.

While not intending to so limit the present invention, the present invention will be described in its preferred mode of a pneumatic actuation system.

In the prior art range clutch actuators, assuming a range shift has been selected/preselected, the main transmission section has been shifted into neutral and the range valve interlock is released, the range valve will provide the selected chamber of the range clutch actuation cylinder/piston with a pressure (usually regulated to about 60 psi-to-80 psi) sufficient to apply a force (about 300 to 400 lbs.) to quickly move the selected clutch into engagement and/or into the blocked position and to apply a significant synchronizing force through the synchronizer friction cones to cause rapid synchronous rotation of the clutch members, unblocking of the synchronizer and movement of the clutch members through the blocker and into positive engagement. If the main section remains in neutral, or in the event of a range section shift into the range low-speed or reduction ratio, the force will not result in damage to the synchronizer and will result in a relatively quick range section engagement. However, in the event the main section is engaged prior to completion of an attempted range section upshift into the range section high speed or direct ratio, serious damage to and/or destruction of the synchronizer may occur relatively quickly in the event of an attempted skip upshift usually within about two (2.0) seconds.

It has been discovered that, upon sensing conditions indicative of the transmission main section being in the not neutral condition during an attempted range section shift into the range section high speed or direct ratio, if the force applied to engage the direct range clutch is gradually reduced to a relatively lower second level (about 40-80 lbs.) the direct ratio synchronized range clutch will still engage upon a substantially synchronous rotation of the clutch members (sleeve 162 and gear 114 in FIG. 3A) while the synchronizers will not, at least within a predetermined time (such as 20 to 45 seconds), be damaged or destroyed.

The force is only gradually reduced from the first higher to the second lower force level as the second lower force is not acceptable for normal engagement of the range synchronizer clutches as a sufficient force is not applied to the synchronizer friction clutches and many range shifts would take an objectionably long period of time.

As may be seen by reference to FIGS. 5 and 5A, the range clutch actuator piston assembly 220 defines a differential area piston 221 having a first surface area 222 (about 3.96 sq. inches) pressurized to engage the low range clutch, and a second larger surface area 224 (about 4.65 sq. inches) pressurized to engage the high speed range clutch with the first level of force ($p*a_{224}$). Assuming a regulated pressure of 80 psi, the first level of force will be about 371 lbs. Venting of chamber 224A to below regulated pressure will result in a lower force engagement of the high speed range clutch.

Piston 221 is sealingly and slidably received in a cylinder divided into two chambers 222A and 224A. Piston 221 includes a shaft 226 to which is mounted shift yoke 164 for shifting synchronized clutch 128 or 92 to the selected positions thereof.

To provide the synchronizer protection effect, while still urging the direct range (high-speed) clutch into engagement, the present invention is effective to (i) actively pressurize the second surface area 224 when a range shift into direct is selected and the main section is in the neutral condition thereof and (ii) to seal chamber 224A from the source of pressure and to gradually vent chamber 224A to a second lower pressure (about 10 to 20 psi) when a range section shift into high is selected and the main section is in the not neutral condition thereof.

The second pressure must result in a second force level sufficient to cause a direct range clutch engagement when synchronous or substantial synchronous rotation of the high speed range clutch members is achieved and preferably should be sufficient to maintain the direct range in engagement (or in-gear detent means should be provided). The second force should be sufficiently low so that when the synchronizer is engaged on the block, with the main transmission section engaged, the synchronizer cone clutches or the like will not suffer substantial damage for a predetermined period of time, such as, for example, twenty (20) to forty-five (45) seconds.

As an example, a first force of about 300-400 lbs. with a second force of about 40-80 lbs. has proven highly satisfactory.

Schematics of air systems to achieve the above effect may be seen by reference to FIGS. 5 and 5A.

Devices for applying either a first or a second relatively lesser force to shifting forks, such as engaging with a larger first and disengaging with a second smaller force, are known in the prior art as may be seen by reference to U.S. Pat. No. 4,928,544, the disclosure of which is hereby incorporated by reference.

A synchronizer protecting range shift air control system 230 is illustrated in FIG. 5. The master range valve 232 is connected to a source of filtered and regulated air rom filter regulator 234. In heavy-duty vehicles, the regulated air pressure is usually 60 to 80 psi. Switch or lever 98 is effective to either pressurize (Low) or vent (High) the low pressure signal or pilot line 236. The low range pilot line 236 connects to the range slave valve 238 which is a two-position, four-way valve spring 240 biased to the high range position (i.e. chamber 224A pressurized and chamber 222A exhausted) and responsive to pressurization of pilot line 236 to move to the low range position (i.e. chamber 222A exhausted) and responsive to pressurization of pilot line 236 to move to the low range position (i.e. chamber 222A pressurized and chamber 224A exhausted).

A shaft (not shown) movable to either an in-gear position or a neutral position may be provided with an interlock plunger (not shown) for preventing initial movement of slave valve 238 until the transmission main section is shifted into a neutral position. The above-described components of control system 230 are considered to be relatively standard in prior art range type transmissions.

To the above components is added (i) a two-position, two-way residual pressure valve 246 in the supply pressure conduit 248 between the regulated source 234 and the slave valve 238 and (ii) a one-way, restricted flow, pressure relief valve assembly 250 for gradually venting chamber 224A.

Residual pressure valve 246 includes a plunger 252 for sensing the neutral or not neutral condition of the transmission main section 12 in cooperation with detent groove 210 in shift shaft 204. Valve 246 is normally open (when sensing main section neutral) and will seal the pressure conduit 248 upon sensing a main section not neutral condition. Accordingly, control system 230 is of the so-called "residual pressure" type.

The notch 210 in shaft 204 may be axially extended or contracted so that an impending as well as an actual main section neutral or not neutral condition may be sensed.

The relief valve 250, which may be seen in greater detail by reference to FIG. 5A, is illustrated as positioned in piston 221 and venting chamber 224A to chamber 222A which is connected to exhaust wherever chamber 224A is pressurized. As may be seen by reference to valve 250A illustrated in dotted lines, the pressure relief valve may be positioned at various positions downstream of slave valve 238 and in fluid communication with chamber 224A.

The one-way, restricted flow pressure relief valve 250 is configured such that the flow restriction therethrough is considerably greater than the flow restrictions from source 234, through conduit 248 and valves 246 and 238 into chamber 224A so that during active pressurization of the high-speed range clutch cylinder chamber, i.e. when range high is selected and valve 246 is in the open position, the flow through restricted relief valve 250 to exhaust will not significantly lower the pressure in the chamber 224A. When conduit 248 is sealed by residual pressure valve 246 during a shift into the range high speed ratio, fluid flow through relief valve 250 will result in a gradually constantly reducing pressurization of chamber 224A from the regulated pressure to the closing pressure (preferably about 10-20 psi) of valve 250. The force exerted by the actuator 220 on the high-speed range clutch will decrease correspondingly.

A possible structure of the one-way, restricted flow pressure relief valve 250 is illustrated in FIG. 5A. A passage 254 through piston 221 includes a reduced diameter restricted portion 256 opening to chamber 224A, on enlarged portion 258 opening to chamber 222A and a generally conical valve seat portion 260 interposed the two end portions. A spherical valve element 262 is biased into sealing contact with valve seat 260 by compression spring 264 which may be adjusted by axial positioning of spring seat 266. Other structures are, of course, possible.

The restriction to fluid flow through passage 256 is very restricted so that chamber 224A will be vented gradually down to the valve closing pressure, about 10 to 20 psi. Further, the restriction to fluid flow through passage 256 is considerably greater than that from the source 234 to the chamber 224A when valve 246 is open so that chamber 224A will be at substantially source pressure when being actively pressurized regardless of the action of the one-way restricted flow pressure relief valve 250.

The relief valve 250 should, however, allow sufficient fluid flow therethrough so that upon sealing of chamber 224A at regulated pressure, chamber 224A will vent down to substantially the reference pressure within about two seconds.

Accordingly, if at any time after initiation of a range shift into range high, the main transmission section is in the not neutral condition, then the high range chamber 224A will be gradually vented. This will allow normal completion of a shift into range high or, if the main section shift beats the range shift, a shift into range high at a considerably reduced force.

While the present invention has been described with a certain degree of particularity, it is understood that the present description is by way of example only and that modification and rearrangement of the parts is possible within the spirit and the scope of the present invention as hereinafter claimed.

We claim:

1. A control method for controlling a shift actuator (96) associated with a synchronized jaw clutch (92) for selectively engaging and disengaging a selectable ratio (high) in a first transmission section (14) of a compound transmission (10) comprising first and second (12) multiple speed transmission sections connected in series, said second transmission section having a neutral and a not neutral condition, said method comprising:
   (a) sensing selection of engagement of said selectable ratio;
   (b) sensing if said second transmission section is in the neutral or the not neutral condition;
   (c) responding to sensing (i) a selection of engagement of said selectable ratio and (ii) said second transmission section in the neutral condition by causing said actuator to urge said synchronized jaw clutch into engagement with a first force; and
   (d) responding to sensing (i) a selection of engagement of said selectable ratio and (ii) said second transmission section in the not neutral condition by causing said actuator to urge said synchronized jaw clutch into engagement with a force gradually reduced from said first force to a lower second force.

2. The method of claim 1 wherein said compound transmission is a manually operated range type transmission, said first transmission section is an auxiliary range section having a high speed and a low speed ratio and said selectable ratio is the high speed range section ratio.

3. A method for controlling the shifting of a compound change gear transmission (10) of the type comprising a manually shifted multiple-speed main transmission section (12) shiftable into an engaged or a not engaged condition connected in series with a multiple-speed auxiliary section (14), said auxiliary section including low-speed (168/172) and high-speed (166/170) synchronized jaw clutches (92) shiftable by an actuator (96) to engage either a low-speed (reduction) or a high speed (direct) auxiliary section ratios, respectively, in response to selection by a master selector (98), said method characterized by:
   sensing a selection of a shift of said auxiliary section into a selected one of the low-speed and the high-speed auxiliary section ratios;
   sensing said main transmission section in either the neutral or the not neutral condition thereof,
   responding to sensing (i) a selection of a shift into the auxiliary section high-speed ratio and (ii) said main transmission section being in the neutral condition by causing said actuator to urge said auxiliary section high speed synchronized jaw clutch into engagement with a first force level; and
   thereafter responding to (i) a continuing selection of a shift into auxiliary section high-speed ratio and (ii) said main transmission section being in the not neutral condition by causing said actuator to urge said auxiliary section high speed synchronized jaw clutch into engagement with a force level gradually reduced from said first force level to a second lower force level.

4. The method of claim 3 wherein said auxiliary section (14) is a two-speed range section and said high speed ratio is a direct speed ratio.

5. The method of claims 1, 2, 3 or 4 wherein said first force level is at least twice as large as said second force level.

6. The method of claims 1, 2, 3 or 4 wherein said high-speed synchronized jaw clutch comprises a pin type synchronizer.

7. The method of claims 3 or 4 wherein said compound transmission is a vehicular transmission having a maximum rated input torque and is intended for use in a vehicle having a maximum expected g.v.w., said second force selected to be (a) sufficient to cause engagement of said auxiliary section high speed synchronized clutch when the jaw clutch members thereof are rotating at a substantially synchronous speed, and (b) insufficient over a predetermined period of time to cause greater than a predetermined wear to the friction surfaces of the auxiliary section high speed synchronized clutch when (i) said clutch is urged into engagement with said main section engaged and is in the blocked condition thereof, (ii) said jaw clutch members are rotating at significantly nonsynchronous speed, (iii) said maximum rated input torque is applied to the transmission input shaft and (iv) said vehicle has the maximum expected g.v.w.

8. A system for controlling the shifting of a compound change gear transmission (10) of the type comprising a manually shifted multiple-speed main transmission section (12) shiftable into an engaged or a not engaged condition connected in series with a multiple-speed auxiliary section (14), said auxiliary section including low-speed (168/172) and high-speed (166/170) synchronized jaw clutches (92) shiftable by an actuator (96) to engage either a low-speed (reduction) or a high speed (direct) auxiliary section ratio in response to selection by a master selector (98), said system characterized by:
- means (98) for sensing a selection of a shift of said auxiliary section into a selected one of the low-speed and the high-speed auxiliary section ratios;
- means (254/256) for sensing said main transmission section being in either said neutral or said not neutral condition thereof,
- means (346) for responding to sensing (i) a selection of a shift into the auxiliary section high-speed ratio and (ii) said main transmission section being in the neutral condition thereof by causing said actuator to urge said high-speed synchronized jaw clutch into engagement with a first force level; and
- means (328) for thereafter responding to sensing (i) a continuing selection of a shift into auxiliary section high-speed ratio and (ii) said main transmission section being in the not neutral condition thereof by causing said actuator to urge said auxiliary section high speed synchronized jaw clutches into engagement with a force gradually reduced from said first force level to a second force level, said second force level being lower than said first force level.

9. The system of claim 8 wherein said auxiliary section (14) is a two-speed range section and said high speed ratio is a direct speed ratio.

10. The system of claims 8 or 9 wherein said first force level is at least twice as large as said second force level.

11. The system of claims 8 or 9 wherein said high-speed synchronized clutch comprises a pin type synchronizer.

12. The system of claims 8 or 9 wherein said compound transmission is a vehicular transmission having a maximum rated input torque and is intended for use in a vehicle having a maximum expected g.v.w., said second force selected to be (a) sufficient to cause engagement of said auxiliary section high speed synchronized clutch when the jaw clutch members thereof are rotating at a substantially synchronous speed, and (b) insufficient over a predetermined period of time to cause greater than a predetermined wear to the friction surfaces of the auxiliary section high speed synchronized clutch when (i) said clutch is urged into engagement with said main section engaged, (ii) said jaw clutch members are rotating at significantly nonsynchronous speed, (iii) said maximum rated input torque is applied to the transmission input shaft and (iv) said vehicle has the maximum expected g.v.w.

13. A method for controlling a pressurized fluid operated shift actuator (220) for an auxiliary transmission section (14) of a compound transmission (10) including a multiple speed main transmission section (12) connected in series with said auxiliary transmission section, said main transmission section having a neutral and a not neutral condition thereof, said auxiliary transmission section including a selectable high speed ratio and a selectable low speed ratio, said high speed ratio engageable by a synchronized jaw clutch assembly (92), a source of pressurized fluid at a regulated pressure (234), switch means (98) for selecting a desired auxiliary section ratio, said actuator (220) comprising a piston (221) having a first piston surface (224) defining a first chamber (224A), and a second piston surface (222) defining a second chamber (222A), pressurization of said first chamber (224A) causing said actuator to urge said synchronized clutch assembly to engage said high speed ratio and pressurization of said second chamber (222A) causing said actuator to urge engagement of said low speed ratio, slave valve means (238) responsive to said switch means and connected to an exhaust (EX) and by a first conduit (248) to said source, said slave valve means responsive to said switch means for connecting said first chamber to said first conduit and said second chamber to said exhaust when said high speed ratio has been selected and for connecting said first chamber to said exhaust and said second chamber to said first conduit when said low speed ratio has been selected, said method comprising:
- sensing (252, 210) the current neutral or not neutral condition of said main transmission section;
- constantly gradualy exhausting said first chamber through a relatively restricted orifice (250) whenever the pressurization of said first chamber is greater than a predetermined reference pressure, said predetermined pressure being lower than said regulated pressure; and
- blocking (246) the flow of pressurized fluid in said first conduit when said main section is in the not neutral condition thereof.

14. The method of claim 13 wherein the restriction of fluid flow through said restricted surface (256) is considerably greater than the restriction of fluid flow from said source to said first chamber when said high speed ratio has been selected and said main transmission section is in the neutral condition thereof.

15. The method of claim 13 wherein said first piston surface defines a first piston surface area being larger than the piston surface area defined by said second piston surface.

16. The method of claims 13, 14 or 15 wherein said fluid is compressed air.

17. Method of claims 13, 14 or 15 wherein said auxiliary section is a range section.

18. Method of claims 13, 14 or 15 wherein said reference pressure is less than one-half as large as said regulated pressure.

19. A system (230) for controlling a pressurized fluid operated shift actuator (220) for an auxiliary transmission section (14) of a compound transmission (10) including a main transmission section (12) connected in series with said auxiliary transmission section, said main transmission section having a neutral and a not neutral condition thereof, said auxiliary transmission section including a selectable high speed ratio and a selectable low speed ratio, said auxiliary section high speed ratio engageable by a synchronized jaw clutch assembly (92), a source of pressurized fluid (234) at a regulated pressure, switch means (98) for selecting a desired auxiliary section ratio, said actuator (220) comprising a piston having a first piston surface (224) defining a first chamber (224A) and a second piston surface (222) defining a second chamber (222A) pressurization of said first chamber (224A) causing said actuator to urge said synchronized jaw clutch assembly to engage said high speed ratio and pressurization of said second chamber (222A) causing said actuator to urge engagement of said low speed ratio, a source of pressurized fluid (234) regulated to a predetermined source pressure, slave valve means (238) connected to an exhaust and connected by a first conduit (248) to said source, said slave valve means responsive to said switch means for connecting said first chamber to said first conduit and connecting said second chamber to said exhaust when said high speed ratio has been selected and for connecting said first chamber to said exhaust and connecting said second chamber to said first conduit when said low speed ratio has been selected, said system comprising:

residual pressure valve means (246) for sensing the current neutral or not neutral condition of said main transmission section and for responding thereto by permitting fluid flow through said first conduit when said main transmission is in the neutral condition thereof and blocking fluid flow through said first conduit when said main transmission is in the not neutral condition thereof; and a one way restricted flow pressure relief valve (250) for constantly exhausting said first chamber (224A) through a severely restricted orifice (256) whenever the pressurization of said first chamber exceeds a reference pressure, said reference pressure being less than said regulated pressure.

20. The system of claim 19 wherein said piston comprises a differential area piston said first piston surface of an area larger than the area of said second piston surface.

21. The system of claim 19 wherein said regulated pressure is at least twice as large as said reference pressure.

22. The system of claim 19 wherein said auxiliary section (14) is a two speed range section.

23. The system of claim 22 wherein said high speed ratio is a direct speed ratio.

24. The system of claim 19 wherein said one way restricted pressure relief valve allows fluid flow from said first chamber (224A) to said second chamber (222A).

25. The system of claim 24 wherein said pressure relief valve assembly is located in said piston and includes an opening to said first piston surface and an opening to said second piston surface.

26. The system of claim 19 wherein the resistance of fluid flow from said first chamber through said one way restricted flow pressure relief valve is considerably greater than the resistance of fluid flow from said source to said first chamber when said main transmission section is in the neutral condition thereof and said high speed ratio has been selected.

* * * * *